Nov. 4, 1941.  W. A. MURPHY  2,261,629
REEL
Filed May 5, 1939
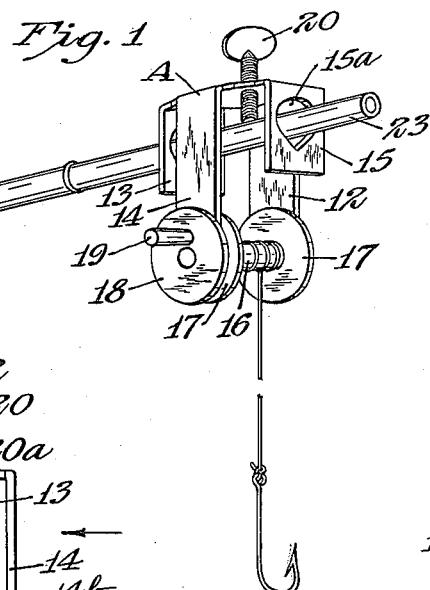
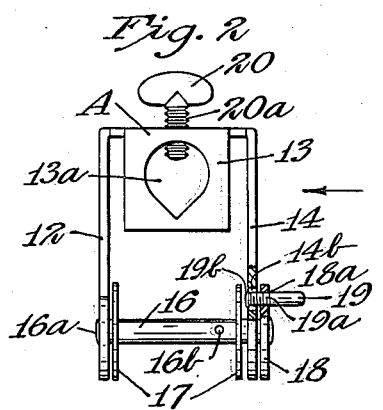
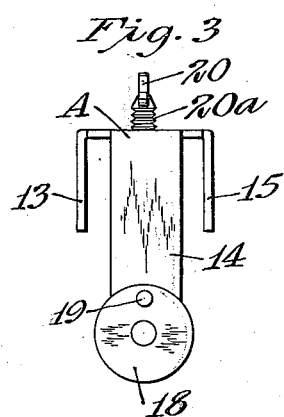
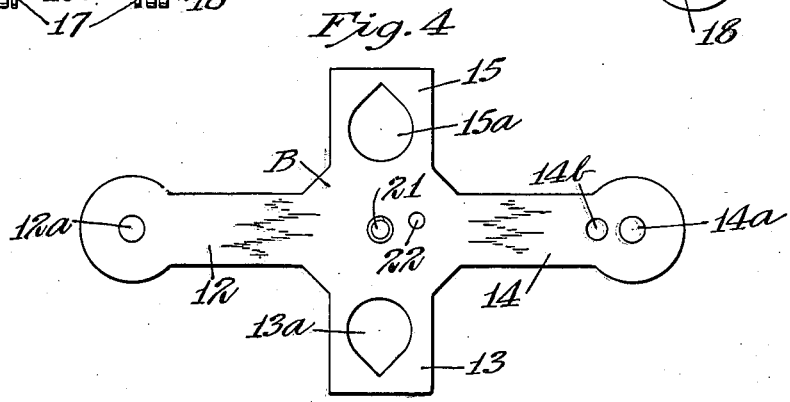
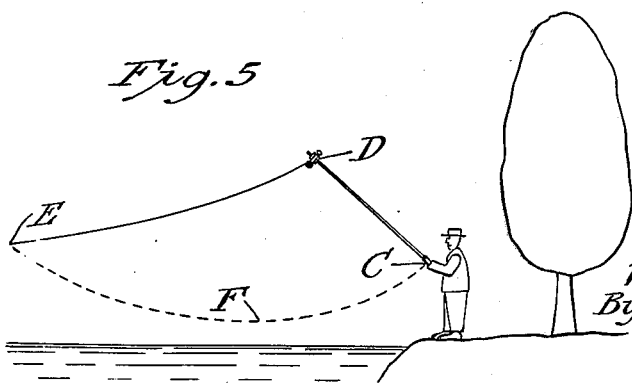
Inventor
Walter Arnold Murphy
By Paul Carpenter
Attorney Patented Nov. 4, 1941

2,261,629

UNITED STATES PATENT OFFICE 2,261,629

REEL

Walter Arnold Murphy, St. Paul, Minn.

Application May 5, 1939, Serial No. 271,869

5 Claims. (Cl. 43—4)

This invention relates generally to reels that may be employed in winding, storing and using lines, cord, rope, string or other materials of similar characteristics. It comprises the novel features of construction and the combination and arrangement of parts hereinafter fully described and claimed in the following specification of which the accompanying drawing forms a part.

One object of the invention is to provide a reel and reel holder of such simplicity and durability of construction as to make it especially adaptable for the particular uses hereinafter specified and to make it inexpensive to produce.

Another object is to provide a simple, inexpensive and yet durable portable reel holder which will permit the rigid attachment of a reel to rod-like holders or brackets.

Another object is to provide a simple and inexpensive device for fishermen which will permit the use of the ordinary fishing poles used in "still fishing" in a manner not possible heretofore, as hereinafter described.

Another object is to provide a single device which will perform several functions in connection with the use of plain fishing poles which are otherwise unequipped with any mechanical or other fitting, including (1) the easy and convenient storage of fish lines used in "still fishing"; (2) the attachment of lines to plain fishing poles in a way to permit rapid attachment and detachment of lines without tying, untying or cutting lines; (3) the shortening or lengthening of a line on a plain pole during use without having to cut, tie or untie the line; (4) the attachment to a plain pole of a line which is longer than the pole in such a manner that the line can be cast without any backthrow so as to permit a far cast in close quarters.

Another object is to provide a single device which will perform the functions named in the preceding paragraph in connection with fishing poles which are equipped with other mechanical or special fittings as well as with poles not so equipped.

One of the forms which the invention may take is illustrated in the accompanying drawing.

Figure 1 is a perspective view of a reel removably attached to the tip or outer end of a fishing pole.

Figure 2 is a side elevation of the reel of Figure 1.

Figure 3 is a side elevation thereof looking in the direction indicated by the arrow in Figure 2.

Figure 4 is a view of a metal plate stamped ready for bending to form the reel frame A.

Figure 5 is a diagrammatic sketch indicating one use of the device.

Referring to the above figures, the frame A may be cast in its final form from metals such as aluminum or substances such as "Bakelite" or other synthetic plastics suitable for the purpose, or it may be made by stamping out a form from suitable sheet metal, e. g. sheet aluminum or sheet iron of suitable thickness such as 18 gauge, the said form being such as the form B shown in Figure 4, and, after threading and otherwise finishing the apertures therein, bending the arms 12, 13, 14 and 15 to form the frame A, in which 12 and 14 form the arms of a U-shaped yoke and 13 and 15 form a second U-shaped yoke, the two yokes having a common bight or base.

The bearing apertures 12a and 14a receive the reel shaft 16 whose end may be enlarged as at 16a to prevent excessive longitudinal movement of the shaft in one direction, and whose other end is rigidly united to a crank arm element such as the crank wheel 18 which prevents excessive longitudinal movement of the shaft in the opposite direction. The hole 16b receives the line and permits its being anchored to the shaft. The discs 17 are mounted on the shaft 16 to prevent the line from coming into contact with the supporting frame and causing undesirable friction, as it is wound and unwound. The discs may or may not be anchored to the shaft. If the anchoring is omitted, the construction is thereby the more simplified and yet it is found that the reel's utility is not lessened thereby.

In order to show more clearly the manner of construction of the handle 19 and of its double function as crank handle and reel lock, the wheel 18 and arm 14 are partly broken away in the drawing in Figure 2 at the point where the handle 19 goes through the apertures 18a and 14b.

The crank wheel 18 is pierced by a threaded aperture at 18a which receives the threaded end of the handle 19. Thus reciprocating longitudinal movement of the handle 19 with respect to the crank wheel 18 and the supporting frame can be obtained by revolving the handle 19 about its own axis. The frame arm 14 is apertured at 14b in a position to register with the aperture 18a so that the reel shaft 16, being fixed to the crank wheel 18, may be locked to prevent its movement by rotating the handle 19 about its own axis in such a manner that the threads 19a by their engagement with the threads in the wheel aperture 18a will cause the handle 19 to project into the frame aperture 14b. The frame aperture 14b is not threaded and is large enough to admit the enlarged end 19b of the handle 19. In Figure 2 the shaft 16 is shown as being locked against turning. To release the lock and to put the shaft 16 in readiness to wind or to unwind the line the handle 19 is rotated about its own axis so that by reason of its threaded engagement with the wheel 18 it is drawn back out of the aperture 14b until its end 19b is clear of the frame arm 14, whereupon the handle 19 is used as a crank to rotate the wheel 18 and shaft 16. The threaded end of the handle 19 is enlarged as at 19b to prevent removal of the handle from the wheel 18. It will be understood that the threads on the handle 19 are in the same direction as the direction in which the reel is turned in winding up the line so that the handle does not move inwardly except when so desired. For example, assuming that the reel is turned to wind up the line in a clockwise direction, the threads on the handle 19 and in the aperture 18a would also be clockwise.

In mounting the reel for use, the apertures 13a and 15a receive the supporting rod 23, and the screw 20 being threaded at 20a is turned through the threaded frame aperture 21 until it presses against the rod 23 thereby holding the frame A in fixed position relative to the rod. The apertures 13a and 15a are preferably made with wedge shaped portions as shown whereby supporting rods of varying size may be used and a firm attachment obtained.

The aperture 22 in the frame is provided to receive and hold the fish-hook when the line is wound up and stored or otherwise not in use.

Figure 5 shows one use of the present device which permits the use of a fishing pole that is otherwise unequipped with mechanical or special fittings in a manner heretofore unknown.

In "still" or "drop-line" fishing it is often desired to drop the line at a point far out from where the fisherman is standing or sitting. To assist in this a line longer than the pole is desirable, but in that event a back-throw or partial cast to the rear must first be made to give the line enough momentum to carry it out over the water when the forward cast is made. However if there is an obstruction in the rear such as trees, a boat house, people, etc., no backthrow can be used. In such circumstances the use of the present device will enable one to secure a far cast without a backthrow.

A reel structure made as shown in Figures 1, 2, 3 and 4 has been found to weigh less than two ounces. It can therefore be mounted on the outer or tip end (the end opposite to the handle end) of a rather long pole as at D in Figure 5. The line, which is wound on the reel shaft 16, is unwound to the length of the pole CD, the reel being left unlocked and free to spin, the fisherman holding the hook and sinker end of the line in his hand. The pole is held over the water in a position somewhat lower than that shown in Figure 5 and when the sinker is let go it swings out, describing a curve, but it does not describe the arc of a circle because the reel begins to unwind, thereby lengthening the line so that the sinker describes a long curve F and at the end of its swing the length of line DE is greater than the original length CD. As the swing progresses the pole is raised somewhat to keep the sinker from striking the water. At the end of the swing the pole is suddenly lowered whereby the hook is dropped at a distance from shore substantially greater than twice the length of the pole.

The principles which underly this new result, which cannot be secured from any previously known combination of reel and rod, may be explained as follows:

Since it is largely the momentum of the swinging line and sinker which causes the reel to unwind, a long pole is preferred when using the reel in this manner. If a reel is attached to the handle of a long pole in the old manner, the line must be threaded through a series of eyes for the full length of the pole and the resulting friction of the line traveling through the eyes will overcome or cancel the pull of the swinging line sufficiently to prevent any substantial unwinding of the reel. But in the present combination of an extremely light weight and free running reel-spool mounted on the end of a long pole, the elements of friction of the line and inertia of a heavy reel are substantially eliminated and the momentum of the line and sinker is sufficient to cause the line to lengthen as desired.

Another feature of the invention heretofore unknown is the crank handle 19 and its combination with the other parts of the device, where, by reason of design and arrangement, a single bar or cylinder of metal threaded at one end and reciprocally mounted serves both to turn the reel and, when desired, to lock it positively against turning in a manner thoroughly efficient and yet with marked simplicity of parts, arrangement, assembly and operation, without springs or any intricate devices, in fact with the use of no moving part other than the handle itself.

Further novelty is to be seen in the entire combination, arrangement and design of parts in all features of the device, of which the above mentioned handle 19 is but one example, whereby simplicity, durability and economy of construction are provided so that reels can be had that are sufficiently light in weight and low in cost to permit their general use in the storage and use of lines and in combination with plain or mechanical fishing poles in "still" or "drop-line" fishing.

This new improvement in reels is not limited to the specific embodiment described, which of course is only illustrative, but contemplates all embodiments within the scope of this application and within the scope of the appended claims.

For example, as a further use of this invention the reel structure may be made of sufficient size and weight to wind, unwind and store clothes lines, the reel when in use, being attached to an upright supporting rod or bracket which may be affixed to a post or building from which it is easily and readily removed to store the line in a suitable place when not in use.

What I claim is as follows:

1. A reel structure comprising a supporting frame comprising two U-shaped yokes with a common base portion and provided with a plurality of pairs of oppositely disposed apertures, one of said pairs of apertures being adapted to receive a rod-like support and clamping means carried by the common base portion of said frame acting upon said support when said support is inserted into said pair of apertures, the other of said pairs of apertures serving to support a line spool journaled therein, means mounted upon said line spool for manually rotating said line spool when in one position and engaging said frame to lock said line spool against rotation when in another position.

2. Means for removably attaching a reel to a supporting member comprising a unitary frame in the form of two U-shaped yokes having a common base portion, the arms of one yoke containing bearing apertures which are oppositely disposed to receive the reel journals, the arms of the other yoke having apertures which are oppositely disposed to receive the supporting member, and a reciprocating member in threaded engagement with the common base portion of said frame adapted to fix said frame in predetermined position on said supporting member.

3. A line reel structure comprising a shaft carrying two discs mounted thereon in spaced relationship between which discs the line is wound, the ends of said shaft extending beyond said discs and being rotatably mounted in a supporting frame, one end of said reel shaft extending through and beyond said frame and having a crank arm rigidly mounted thereon substantially normal to the axis of said shaft and substantially parallel to and in close proximity to said supporting frame, a handle substantially parallel with the axis of said shaft extending through the outer end portion of said crank arm and mounted in threaded engagement therewith for movement along its own axis with respect to the crank arm, an aperture in said supporting frame positioned to receive an extended portion of said handle in one position whereby said handle serves alternatively as a reel lock and as a crank handle when its position is shifted by turning it about its own axis, the said supporting frame comprising a single piece of sheet material with four arms bent with respect to a common base portion to form two U-shaped yokes, the reel being mounted in one yoke, the arms of the other yoke being apertured to receive a supporting rod extending through both arms and the base of the frame carrying a bolt in threaded engagement therewith positioned to be turned against the rod to clamp the reel frame rigidly thereto.

4. In combination with a fishing pole or section thereof, a reel structure as described in claim 1 attached to the tip or outer end thereof.

5. In combination, a frame adapted to removably support a reel spool on a rod-like support comprising a member formed from a single stamping of sheet material and provided with a plurality of apertures, one pair of said apertures being oppositely disposed and adapted to receive said rod-like support, and clamping means engaging said rod-like support operatively mounted in another of said apertures, another pair of said apertures being oppositely disposed and serving to support said reel spool, and another of said apertures adapted to receive means carried by said reel spool to lock said reel spool against rotation.

WALTER ARNOLD MURPHY.